(12) United States Patent
Yakabe

(10) Patent No.: US 6,185,856 B1
(45) Date of Patent: Feb. 13, 2001

(54) SUPPORT FOR FISHING ROD

(75) Inventor: Yukuo Yakabe, Yokosuka (JP)

(73) Assignee: Yugen Gaisha Shonan Keiso, Kanagawa (JP)

(*) Notice: Under 35 U.S.C. 154(b), the term of this patent shall be extended for 0 days.

(21) Appl. No.: 09/383,012

(22) Filed: Aug. 25, 1999

(30) Foreign Application Priority Data

Sep. 10, 1998 (JP) .................................................. 10-256962

(51) Int. Cl.$^7$ .................................................. A01K 97/10
(52) U.S. Cl. ........................... 43/21.2; 224/922; 224/200
(58) Field of Search ........................ 43/21.2; D22/147; 248/534, 535, 538; 224/200, 922

(56) References Cited

U.S. PATENT DOCUMENTS

| | | | |
|---|---|---|---|
| 4,682,438 | * 7/1987 | Arrow | 43/21.2 |
| 4,739,575 | * 4/1988 | Behrle | 43/21.2 |
| 4,817,323 | * 4/1989 | Braid | 43/21.2 |
| 4,828,152 | * 5/1989 | Pepping | 224/200 |
| 4,858,364 | * 8/1989 | Butts | 43/21.2 |
| 5,571,228 | * 11/1996 | McMurtrie | 43/21.2 |
| 5,573,167 | * 11/1996 | Bebb et al. | 224/666 |
| 5,738,257 | * 4/1998 | McConnell | 224/200 |
| 5,953,846 | * 9/1999 | Shelton | 43/21.2 |
| 5,956,883 | * 9/1999 | Krouth et al. | 43/21.2 |
| 5,992,717 | * 11/1999 | Clewes et al. | 224/251 |
| 5,992,814 | * 11/1999 | Allord | 248/535 |
| 6,029,872 | * 2/2000 | Ellington | 224/251 |

\* cited by examiner

Primary Examiner—Kurt Rowan
(74) Attorney, Agent, or Firm—Arent Fox Kintner Plotkin & Kahn, PLLC

(57) ABSTRACT

A support for a fishing rod includes an abutment plate, a mounting device for mounting the abutment plate on the body of a fisher-person, a support base mounted on the abutment plate, and a support tube formed of a coil spring with a flexibility and secured to the support base at an inclined attitude with its tip end directed upwards. The support tube is formed, so that a base end portion of the fishing rod fitted in the support tube is rotatably supported on an inner peripheral surface of the support tube, and the fishing rod can be swung vertically and laterally by the flexing of the support tube. A widened portion is formed at the tip end of the support tube for supporting an annular shoulder portion connected to an upper end of the base end portion of the fishing rod, whereby a flexible portion in which the fishing rod is not fitted, is left. Thus, the fisher-person can support the fishing rod easily and stably at a usual upward angle using one hand only by fitting the base end portion of the fishing rod into the support tube with the abutment plate put into abutment against the body of the fisher-person. In addition, the fisher-person can guide the fishing rod to an inner peripheral surface of the fishing rod to freely rotate the fishing rod and moreover, can freely and stably swing the fishing rod vertically and laterally by only one hand, while suitably flexing the support tube formed of the coil spring.

6 Claims, 8 Drawing Sheets

SUPPORT FOR FISHING ROD

BACKGROUND OF THE INVENTION

1. Field of the Invention

The present invention relates to a support for a fishing rod, which is designed so that a fisher-person or an angler can support a base end of the fishing rod on his or her body to easily swing the fishing rod vertically and laterally.

2. Description of the Related Art

In general, before a fisher-person lands a fish caught at a fishing hook, he or she swings the fishing rod vertically and laterally in accordance with the movement of the fish in water to fatigue the fish. During this time, the fisher-person holds the fishing rod in his or her arms, or directly supports the base end of the fishing rod on his or her stomach or abdomen.

It is not easy for the fisher-person to swing the fishing rod vertically and laterally, while holding the fishing rod in his or her arms, or directly supporting the base end of the fishing rod on his or her stomach or abdomen, particularly when he or she is landing a large fish. Moreover, this swinging action of the fishing rod may damage clothes of the fisher-person.

SUMMARY OF THE INVENTION

Accordingly, it is an object of the present invention to provide a support for a fishing rod, which is designed so that a fisher-person puts the support on his or her body to carry the fishing rod thereon, so that the fishing rod can not only be rotated, but also easily swung vertically and laterally without damaging the clothes of the fisher-person.

To achieve the above object, according to the present invention, there is provided a support for a fishing rod comprising an abutment plate, a mounting means for mounting the abutment plate on the body of a fisher-person, a support base mounted on the abutment plate, and a support tube formed of a coil spring with a flexibility and secured to the support base at an inclined attitude with a tip end thereof directed upwards, wherein the support tube is formed to rotatably support a base end portion of the fishing rod at an inner peripheral surface of the support tube to which the based end portion is to be fitted, and to permit the fishing rod to swing vertically and laterally by flexing of the support tube, and wherein the support tube has a widened portion formed at a tip end thereof for supporting an annular shoulder portion of the fishing rod connected to an upper end of the base end portion to limit the depth of fitting of the base end portion of the fishing rod into the support tube.

With this feature, it is possible for the fisher-person to support the fishing rod easily and stably at a usual upward inclined angle using one hand by only fitting the base end portion of the fishing rod into the support tube while placing the abutment plate into abutment against the body of the fisher-person. Moreover, the fisher-person can guide the fishing rod to the inner peripheral surface of the support tube and rotate it freely, and can freely and stably swing the fishing rod vertically and laterally using only one hand, while suitably flexing the support tube formed of the coil spring. During this time, the restoring force of the support tube acts and hence, an over-swinging of the fishing rod can be prevented, and at the same time, the swinging-back can be performed easily. During such manipulation, a load applied from the fishing rod to the support tube is received by the abutment plate and dispersed over a wide range of the body of the fisher-person. Therefore, damages to the clothes of the fisher-person can be prevented, and the fatigue of the fisher-person can be alleviated.

A good flexible portion, which is not fitted with the fishing rod, can be ensured in the support tube by supporting the annular shoulder portion of the fishing rod on the widened portion thereby to limit the depth of fitting of the base end portion of the fishing rod into the support tube. Moreover, the widened portion can exhibit a guiding function to facilitate the fitting of the base end portion of the fishing rod into the support tube.

The above and other objects, features and advantages of the invention will become apparent from the following description of the preferred embodiments taken in conjunction with the accompanying drawings.

BRIEF DESCRIPTION OF THE DRAWINGS

FIGS. 1 to 6 show a first embodiment of the present invention, wherein

FIG. 1 is a view of a support for a fishing rod in a state of use;

FIG. 2 is a front view of the support for the fishing rod;

FIG. 3 is a sectional view taken along a line 3—3 in FIG. 2;

FIG. 4 is a sectional view taken along a line 4—4 in FIG. 2;

FIG. 5 is a sectional view taken along a line 5—5 in FIG. 4;

FIG. 6 is a view of the support for the fishing rod for explaining the mounting outline;

FIGS. 7 and 8 show a second embodiment of the present invention, wherein

FIG. 7 is a front view of a support for a fishing rod; and

FIG. 8 is a sectional view taken along a line 8—8 in FIG. 7.

DESCRIPTION OF THE PREFERRED EMBODIMENTS

The present invention will now be described by way of embodiments shown in the accompanying drawings.

A first embodiment of the present invention will first be described with reference to FIGS. 1 to 6.

Figure 1:
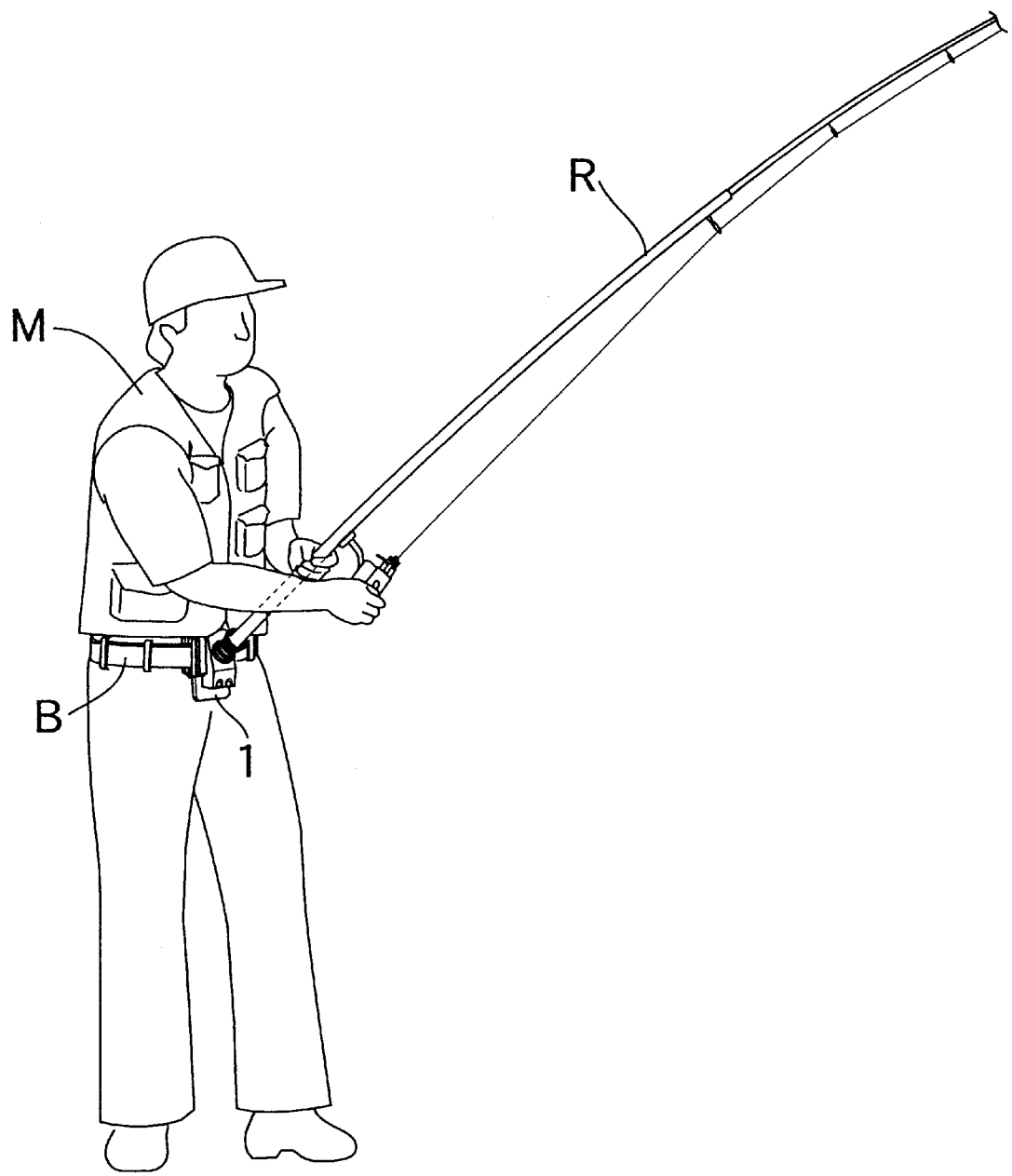
Figure 2:
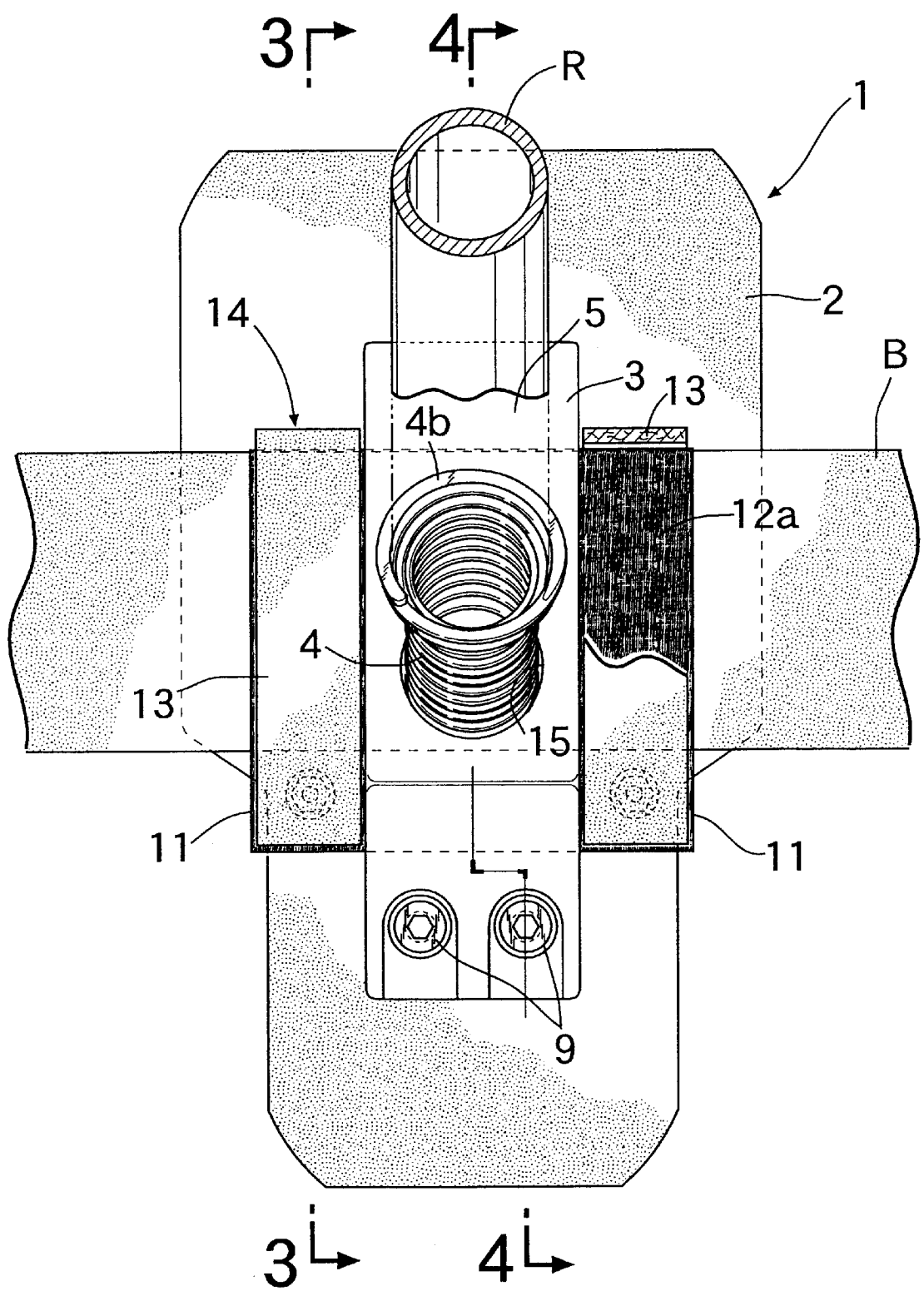
Figure 3:
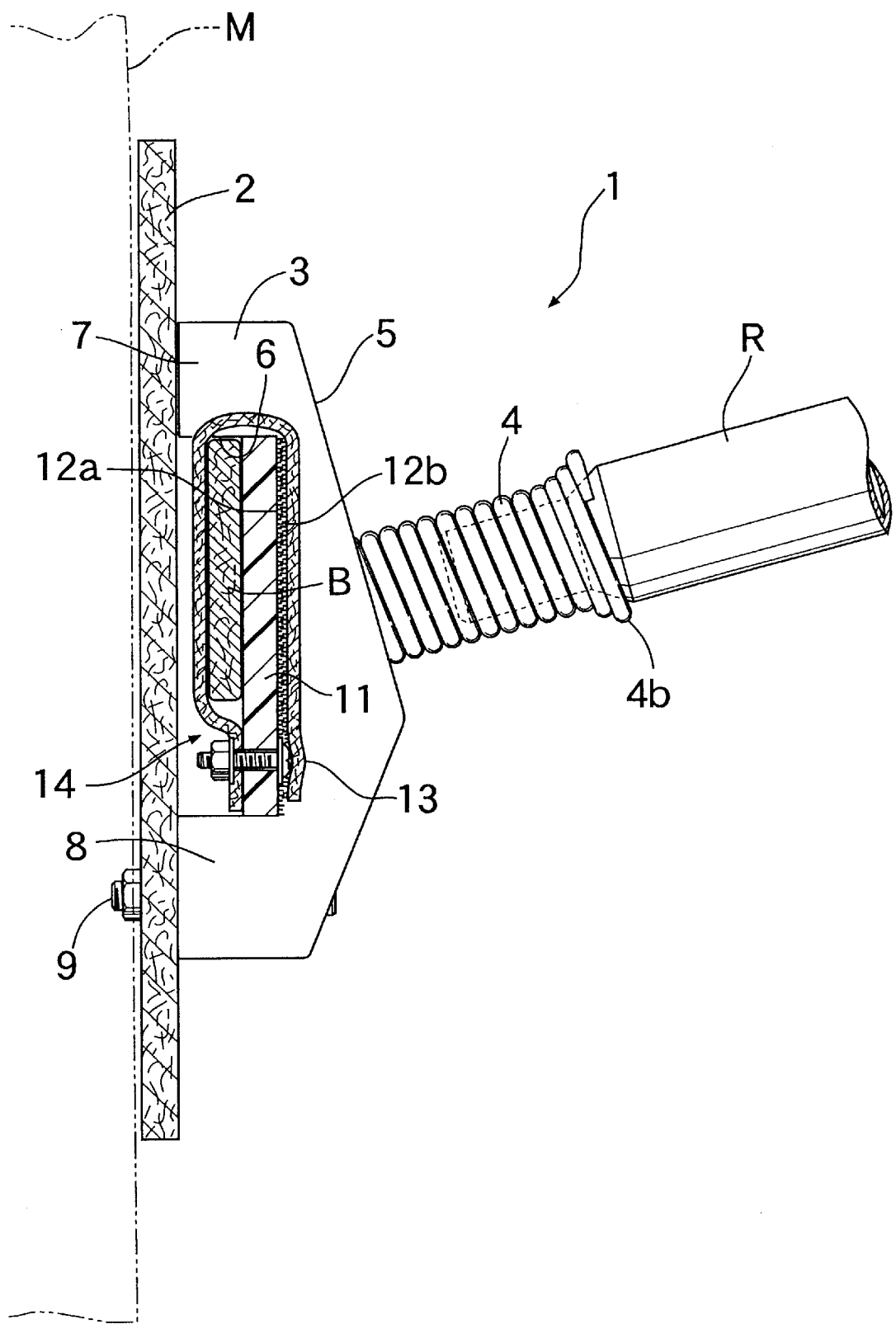
Figure 4:
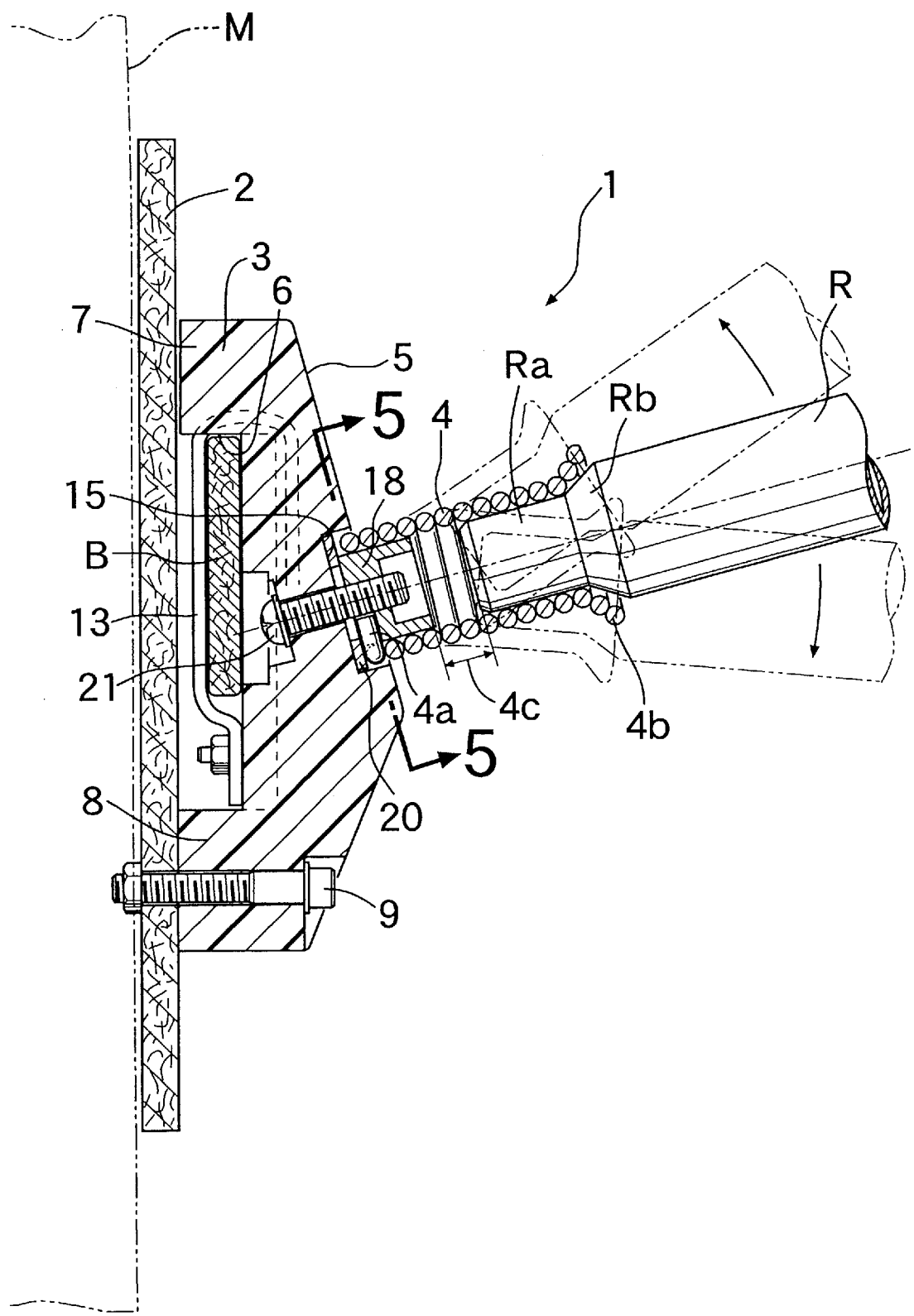
Figure 5:
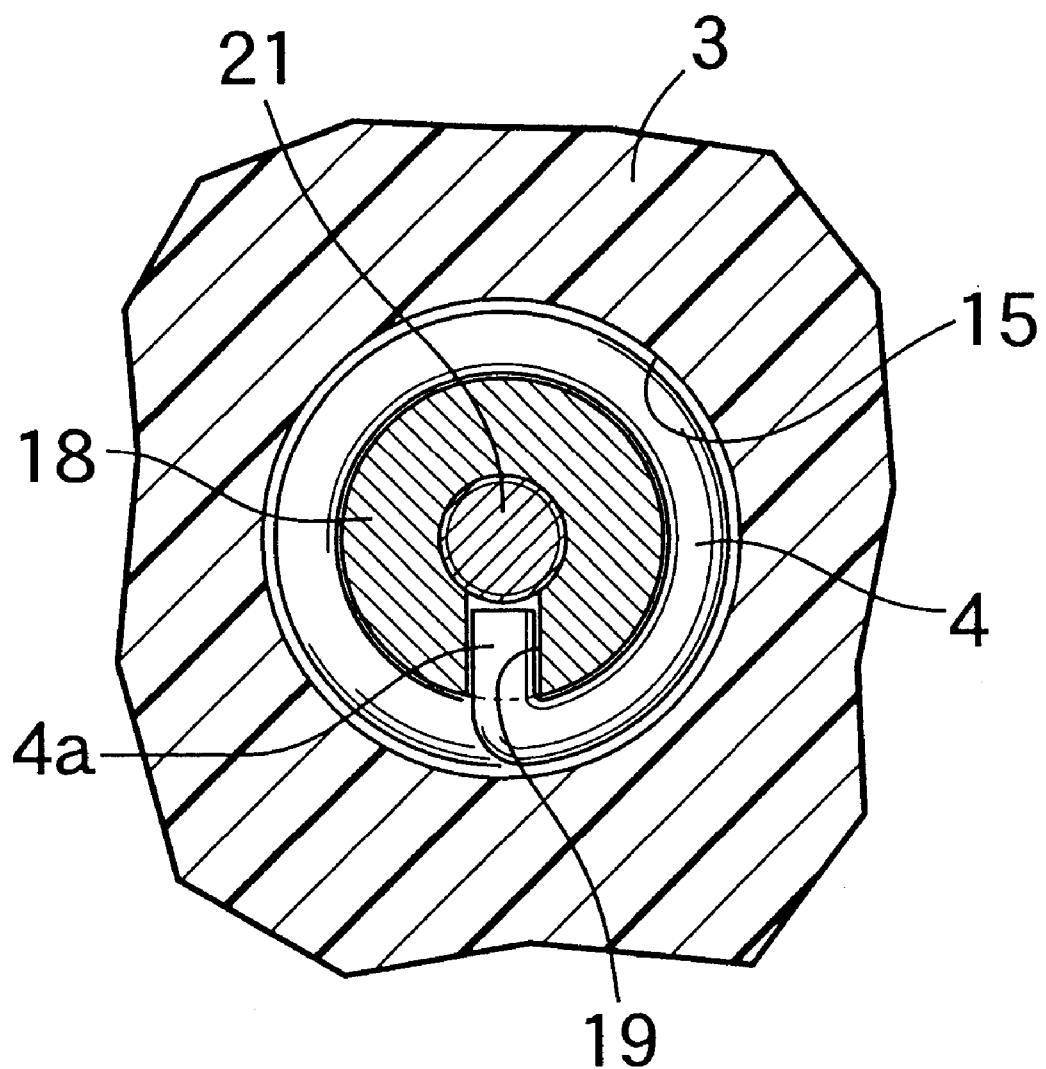
Figure 6:
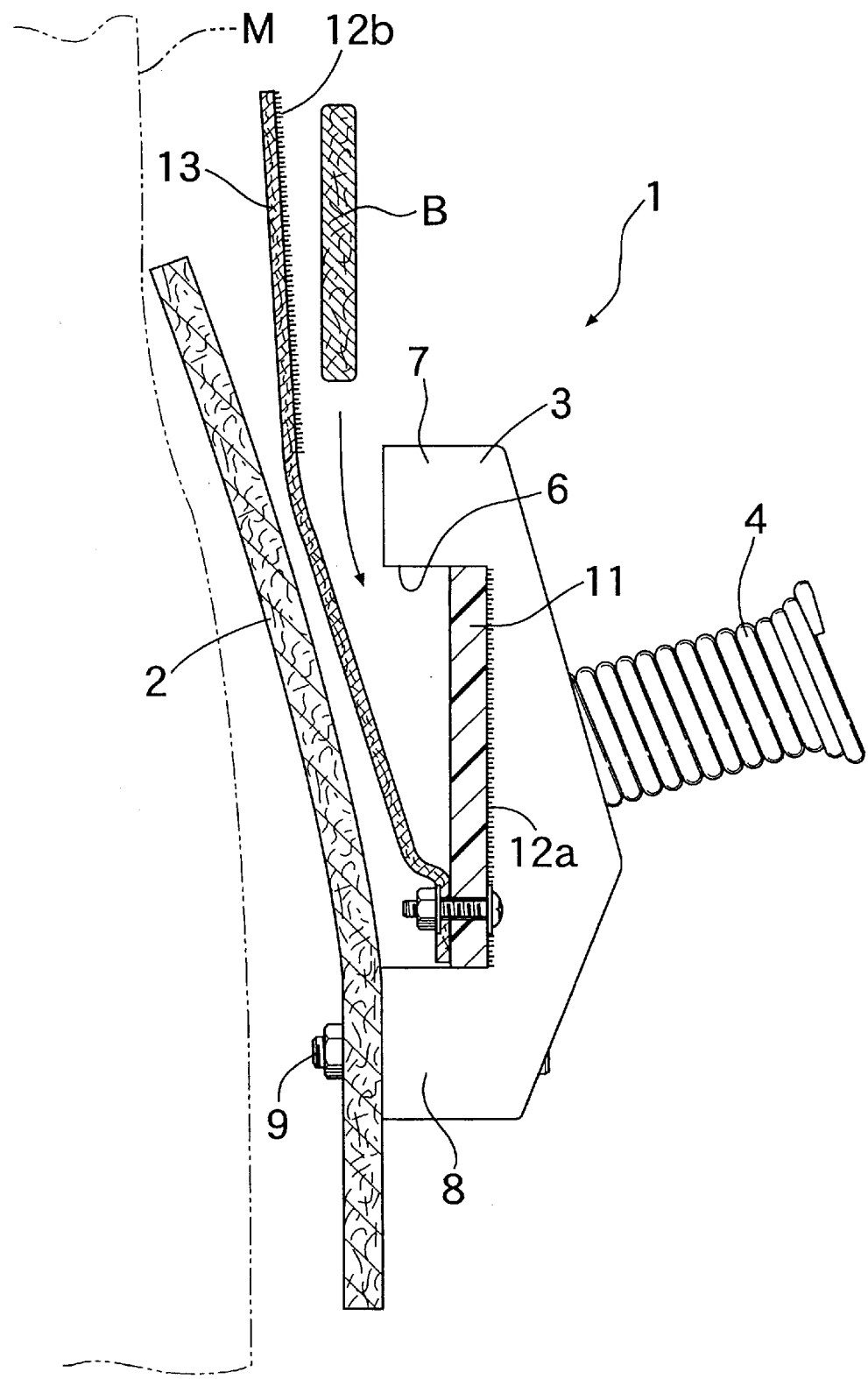

As shown in FIG. 1, a support 1 for a fishing rod according to the present invention is mounted on the body of a fisher-person M in use.

Referring to FIGS. 2 to 5, the support 1 for the fishing rod is comprised of the following main elements: an abutment plate 2, a support base 3 mounted on a front surface of the abutment plate 2, and a support tube 4 secured to a front surface of the support base 3.

The abutment plate 2 is made of leather or synthetic resin, and has both of a rigidity and a moderate flexibility. The abutment plate 2 is formed to such a size that it can be put into abutment against a proper place on the body of the fisher-person M, e.g., a stomach or abdomen or a waist of the fisher-person M.

The support base 3 is made of synthetic resin, and has an upward-inclined support tube mounting face 5 formed on its front surface, and a pair of upper and lower projections 7 and 8 defined in a rear surface to define a groove-shaped belt-engage portion 6. The projections 7 and 8 of the support base 3 are opposed to the front surface of the abutment plate 2, and the support base 3 is coupled at only the lower projection 8 to the abutment plate 2 by a bolt 9. Therefore, the upper projection 7 can be moved away from and toward the abutment plate 2 by the flexing of the abutment plate 2, so that a waist belt B put on the fisher-person M can be inserted into the belt-engage portion 6 through between the upper projection 7 and the abutment plate 2.

A pair of left and right collar portions 11, 11 are integrally formed on the support base 3 to extend along an inner surface of the belt-engage portion 6. A face fastener 12a is adhered to each of the front surfaces of the collar portions 11, 11, and a strap 13 is fixed at one end thereof to a rear surface of the face fastener 12a and capable of being folded to straddle each of the collar portions from above. A face fastener 12b capable of being coupled to the face fastener 12a is adhered to the other end of the strap 13.

The belt-engage portion 6, the strap 13 and the face fasteners 12a and 12b constitute a mounting means 14 for mounting the abutment plate 2 to the body of the fisher-person M.

A positioning recess 15 is defined in the upward-inclined support tube mounting face 5 of the support base 3, and the support tube 4 is secured at one end thereof to the support base 3 in the positioning recess 15.

The support tube 4 is formed of a close-contact coil spring to have a moderate flexibility. A mounting piece 4a is formed at one end of the support tube 4 by bending an end of a spring wire material radially inwards, and a tapered widened portion 4b having a spring coil diameter increased outwards is formed at the other end of the support tube 4.

A nut 18 is fitted to an inner peripheral surface of one end portion of the support tube 4 and has a locking groove 19 in one end face thereof, so that the mounting piece 4a is engaged in the locking groove 19. The nut 18 is threadedly engaged with a bolt 21 extending through the support base 3 from the rear, in a state in which the nut 18 has been pushed against a bottom surface of the positioning recess 15 with a flat washer 20 interposed therebetween. In such a manner, the mounting piece 4a is secured to the support base 3 with the flat washer 20 interposed therebetween, and the support tube 4 is retained at an inclined attitude with the widened portion 4a at a tip end being directed forwards and upwards.

The support tube 4 is designed, so that a base end portion Ra of the fishing rod R is rotatably fitted to an inner peripheral surface of the support tube 4. A tapered annular shoulder portion Rb is connected to an upper end of the base end portion Ra which is supported at the widened portion 4b, when the fishing rod R is fitted into the support tube 4 until it reaches a given depth. Thus, a free flexible portion 4c, in which the nut 18 and the fishing rod R are not fitted, is ensured on the support tube 4.

The operation of this embodiment will be described below.

When the support 1 for the fishing rod is to be mounted, the left and right straps 13, 13 are first stretched upwards, and the waist belt B on trousers is accommodated into the belt-engage portion 6 on a back of the support base 3, while sandwiching the straps 13, 13 and the abutment plate 2 between the body of the fisher-person M and the waist belt B. Then, the straps 13, 13 are folded forwards, and the face fasteners 12b, 12b of the straps 13, 13 are placed onto and coupled to the face fasteners 12a, 12a of the collar portions 11, 11. The waist belt B can be utilized to easily mount the support 1 for the fishing rod to the body of the fisher-person M without unfastening a buckle of the waist belt B, and the abutment plate 2 can be maintained at a state of abutment against a desired place of the body.

In fishing, the base end portion Ra of the fishing rod R is fitted into the support tube 4 of the support 1 for the fishing rod. This fitting can be performed easily by a guiding function of the widened portion 4b at the tip end of the support tube 4.

The base end portion Ra of the fishing rod R is supported in the support tube 4 inclined forwards and upwards and hence, the fisher-person M can support the fishing rod R easily and stably at a usual upward angle using one hand.

Moreover, the fisher-person M can guide the fishing rod R to the inner peripheral surface of the support tube 4 to rotate it freely and hence, the position of a reel can be changed smoothly by rotating the fishing rod R. Further, the fishing rod R can be swung stably, vertically and laterally by only one hand, while the support tube 4 is being flexed suitably. In this case, the restoring force of the support tube 4 acts and hence, the over-swinging of the fishing rod can be prevented and at the same time, the swinging-back can be performed easily. Therefore, the fishing rod R can be swung easily, vertically and laterally using one hand in accordance with the movement of a fish caught at a fishing hook and hence, the manipulation of the reel by the other hand can be performed easily.

In this case, the free flexible portion 4c, in which the nut 18 and the fishing rod R are not fitted, is ensured in the support tube 4, particularly, by supporting the annular shoulder portion Rb of the fishing rod R by the widened portion 4b of the support tube 4. Therefore, the stable flexing characteristic can be provided to the support tube 4 by the flexible portion, thereby providing a good feeling of manipulation.

During such manipulation, a load applied from the fishing rod R to the support tube 4 is received by the abutment plate 2 and dispersed in a wide range of the body of the fisher-person M. Therefore, even when a large fish is caught, any damage to clothes of the fisher-person M can be prevented, and the fatigue of the fisher-person M can be alleviated.

Figure 7:
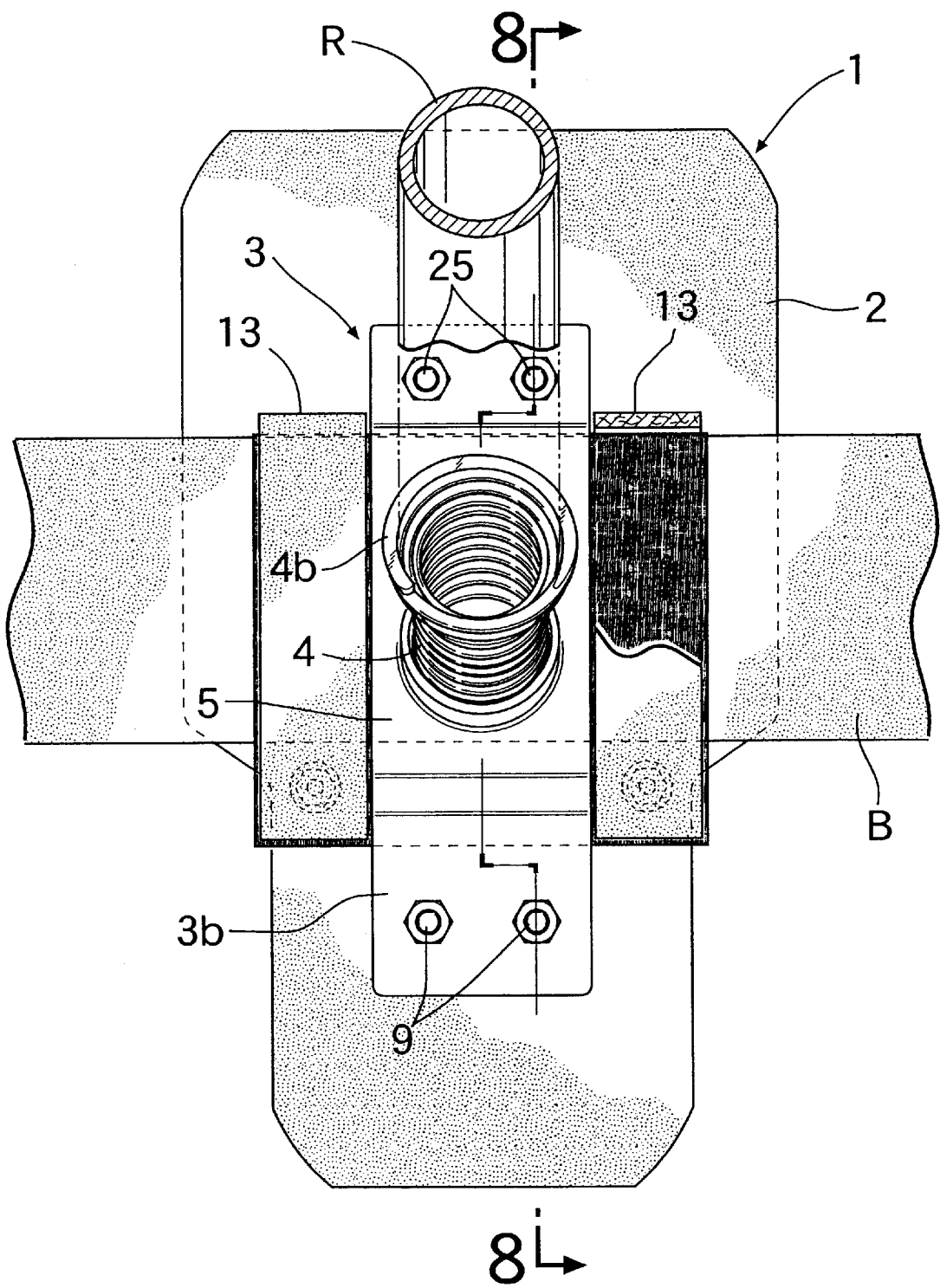
Figure 8:
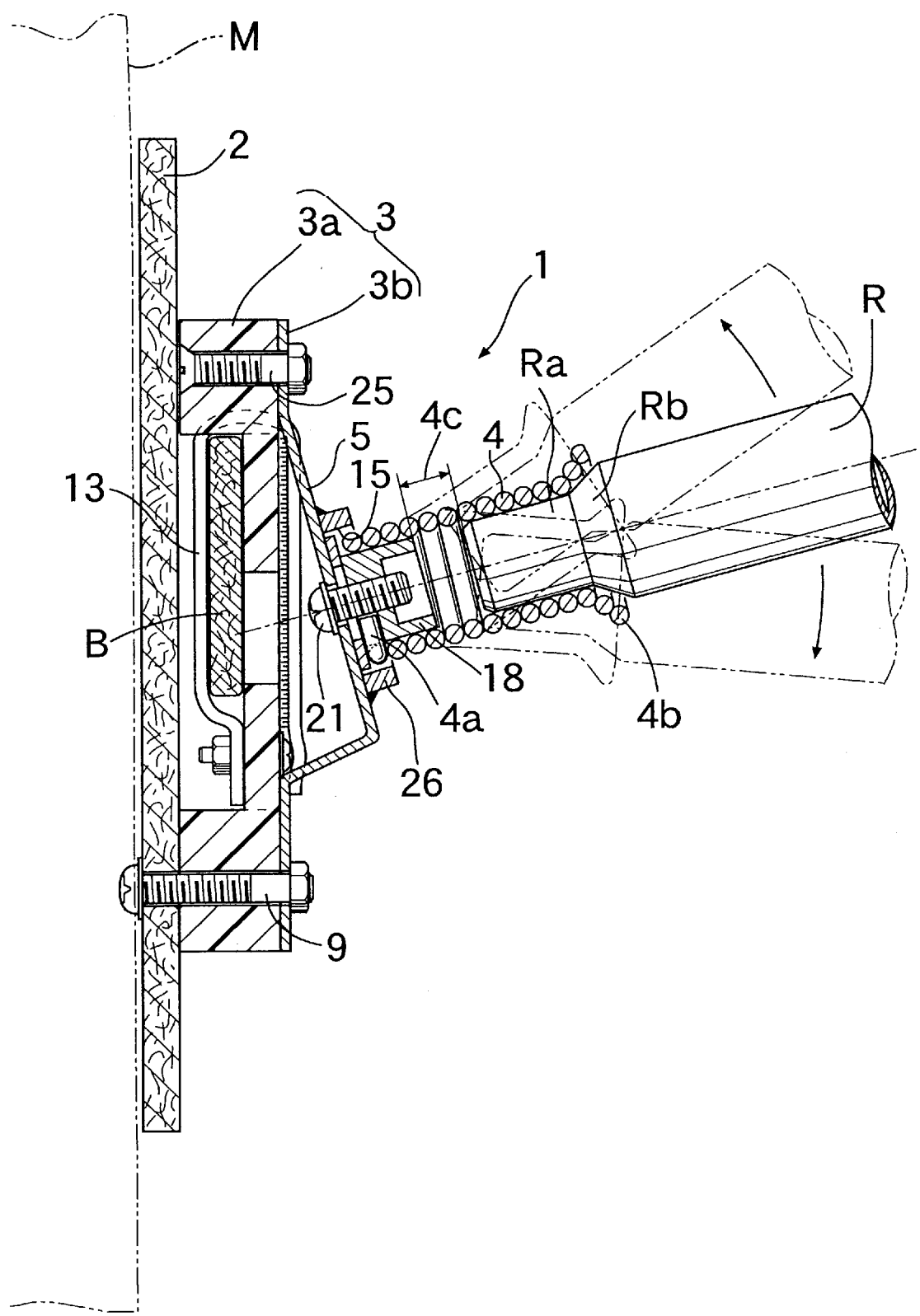

A second embodiment of the present invention will now be described with reference to FIGS. 7 and 8.

In the second embodiment, a support base 3 is comprised of a support base body 3a made of a synthetic resin and secured to an abutment plate 2 by a bolt, and an inclined plate 3b made of a steel and secured to a front surface of the support base body 3a by bolts 9 and 25. A support tube mounting face 5 is formed on a front surface of the inclined plate 3b by the bending formation of the inclined plate 3b. A collar 26 is welded to the support tube mounting face 5 to define a positioning recess 15, and the support tube 4 is secured at one end thereof to the inclined plate 3b within the collar 26 by a nut 18 and a bolt 21. The other arrangement is substantially similar to that in the previous embodiment and hence, the portions or components corresponding to those in the previous embodiment are designated by like reference characters and the description of them is omitted.

According to the second embodiment, several types of inclined plates 3b having different inclination angles of the support tube mounting face 5 are prepared, and any one of these inclined plates 3b is selected as desired, and secured to the support base body 3a. Thus, it is possible to provide a support 1 for a fishing rod having a support tube 4 with an angle suited for fishing conditions and/or the preference of a fisher-person.

Although the embodiments of the present invention have been described in detail, it will be understood that the present invention is not limited to the above-described embodiment, and various modifications in design may be made without departing from the spirit and scope of the invention defined in claims. For example, a suspender may be used as the mounting means 14, whereby the abutment plate 2 can be suspended from the fisher-person's shoulder by the suspender.

What is claimed is:

1. A support for a fishing rod comprising an abutment plate, a mounting means for mounting said abutment plate on the body of a fisher-person, a support base mounted on said abutment plate, and a support tube formed of a coil spring with a flexibility and secured to said support base at an inclined attitude with a tip end thereof directed upwards, wherein said support tube is formed to rotatably support a base end portion of the fishing rod at an inner peripheral surface of said support tube to which said base end portion is to be fitted, and to permit the fishing rod to swing vertically and laterally by flexing of said support tube, and wherein said support tube has a widened portion formed at a tip end thereof for supporting an annular shoulder portion of the fishing rod connected to an upper end of said base end portion to limit the depth of fitting of said base end portion of the fishing rod into said support tube.

2. A support for a fishing rod according to claim 1, wherein said support tube is provided with a flexible portion which is not fitted with said fishing rod.

3. A support for a fishing rod according to claim 1 or 2, wherein said mounting means includes a belt-engage portion which is provided openably and closably between said abutment plate and said support base for insertion of a waist belt put on the fisher-person.

4. A support for a fishing rod according to claim 3, wherein said mounting means further includes a collar portion formed on said support base so as to face said belt-engage portion, and a strap for fastening said collar portion to said waist belt inserted into the belt-engage portion.

5. A support for a fishing rod according to claim 4, wherein one of opposite ends of said strap is secured to said collar portion, and the other end of said strap is capable of being connected to said collar portion through fasteners.

6. A support for a fishing rod comprising an abutment plate, a mounting means for mounting said abutment plate on the body of a fisher-person, a support base mounted on said abutment plate, and a support tube formed of a coil spring with a flexibility and secured to said support base at an inclined attitude with a tip end thereof directed upwards, wherein said support tube is formed to rotatably support a base end portion of the fishing rod at an inner peripheral surface of said support tube to which said base end portion is to be fitted, and to permit the fishing rod to swing vertically and laterally by flexing of said support tube, and wherein said mounting means is comprised of a belt-engage portion provided openably and closably between said abutment plate and said support base for insertion of a waist belt put on a fisher-person, a collar portion formed on said support base so as to face said belt-engage portion, and a strap for fastening said collar portion to said waist belt inserted into said belt-engage portion.

* * * * *